US010034091B2

(12) United States Patent
Seiler

(10) Patent No.: US 10,034,091 B2
(45) **Date of Patent: *Jul. 24, 2018**

(54) MULTI-CHANNEL AUDIO VIBRATORY ENTERTAINMENT SYSTEM

(71) Applicant: Brock Maxwell Seiler, Jefferson Valley, NY (US)

(72) Inventor: Brock Maxwell Seiler, Jefferson Valley, NY (US)

(73) Assignee: SONICSENSORY, INC., Los Angeles, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/219,109

(22) Filed: Jul. 25, 2016

(65) Prior Publication Data

US 2016/0337754 A1 Nov. 17, 2016

Related U.S. Application Data

(63) Continuation of application No. 12/705,097, filed on Feb. 12, 2010, now Pat. No. 9,402,133.

(Continued)

(51) Int. Cl.
*G06F 17/00* (2006.01)
*H04R 3/12* (2006.01)

(Continued)

(52) U.S. Cl.
CPC ................. *H04R 3/12* (2013.01); *H04R 1/02* (2013.01); *H04R 5/023* (2013.01);

(Continued)

(58) Field of Classification Search
CPC .......... H04R 2460/13; H04R 2201/023; H04R 5/023

See application file for complete search history.

(56) References Cited

U.S. PATENT DOCUMENTS

| | | | |
|---|---|---|---|
| 5,201,003 | A | 4/1993 | Pavel |
| 5,553,148 | A | 9/1996 | Werle |

(Continued)

OTHER PUBLICATIONS

International Preliminary Report on Patentability for International Application No. PCT/US2010/024087, dated Aug. 16, 2011.

(Continued)

*Primary Examiner* — Joseph Saunders, Jr.
(74) *Attorney, Agent, or Firm* — Neal, Gerber & Eisenberg LLP

(57) ABSTRACT

An entertainment system is provided, the system comprising a portable media device configured to simultaneously produce an audible output signal and a plurality of vibratory output signals, the audible output signal representing a multi-track recording comprising a plurality of individual recorded tracks, each vibratory output signal based on at least one individual recorded track; and a plurality of actuators positioned at various locations on a user's body, each actuator configured to receive a respective one of the vibratory signals and to vibrate based on the received signal. A method of mixing a multi-track vibratory recording is also provided, the method comprising utilizing an entertainment system to feel vibrations representing individual recorded tracks on different locations of a user's body; and for each actuator, selecting at least one of the tracks based on suitability for driving the actuator, and providing, to the actuator, a vibratory signal derived from the selected track.

26 Claims, 4 Drawing Sheets

Related U.S. Application Data

(60) Provisional application No. 61/207,442, filed on Feb. 12, 2009.

(51) Int. Cl.
*H04R 5/02* (2006.01)
*H04R 1/02* (2006.01)

(52) U.S. Cl.
CPC .. *H04R 2201/023* (2013.01); *H04R 2205/021* (2013.01); *H04R 2400/03* (2013.01); *H04R 2420/07* (2013.01); *H04R 2499/11* (2013.01)

(56) References Cited

U.S. PATENT DOCUMENTS

| | | | |
|---|---|---|---|
| 6,369,312 | B1 | 4/2002 | Komatsu |
| 2006/0011042 | A1 | 1/2006 | Brenner |
| 2006/0153155 | A1 | 7/2006 | Jacobsen et al. |
| 2007/0038164 | A1 | 2/2007 | Afshar |
| 2009/0231276 | A1 | 9/2009 | Ullrich et al. |

OTHER PUBLICATIONS

International Search Report for International Application No. PCT/US2010/024087, dated May 18, 2010.

Written Opinion of the International Searching Authority for International Application No. PCT/US2010/024087, dated May 18, 2010.

17

9
10
11
14
13
12
15
10
11
16

MULTI-CHANNEL AUDIO VIBRATORY ENTERTAINMENT SYSTEM

CROSS-REFERENCE TO RELATED APPLICATION

This application is a continuation of U.S. Non-Provisional patent application Ser. No. 12/705,097, filed Feb. 12, 2010 and entitled "Multi-Channel Audio Vibratory Entertainment System," to be issued as U.S. Pat. No. 9,402,133, which claims priority from U.S. Provisional Patent Application Ser. No. 61/207,442, filed Feb. 12, 2009 and entitled "Multi-Channel Entertainment Media Player System with Audio Activated Vibrating Apparel & Footwear," the entire contents of each application being incorporated by reference herein.

BACKGROUND

Field of the Disclosure

The present disclosure relates to an entertainment system including a media player that provides a stereo audio output signal and a plurality of individual vibratory output signals based on individual tracks of the stereo audio media and synchronized therewith, and a plurality of actuators, each of which receives an individual vibratory output signal of the plurality of vibratory output signals and is operable to vibrate based on the received vibratory signals on the body of the user.

Related Art

Present entertainment systems for listening to audio focus mainly on the user enjoying music which has been mixed down to stereo, for speakers or headphones. Thus, the full audio spectrum of the musical piece is being sent directly to the user's ears. While some systems introduce additional elements, like sub woofers, this does little to enhance the experience of the vibratory force feedback of the separate instruments in an arrangement. Tactile transducers mounted on theater seats, walls and flooring, for example, also do little to enhance the separate parts that make up the stereo experience for users.

The ears alone cannot separate rhythmic vibrations. The brain has to decipher the separate rhythmic instrumentation based on the incoming audio, via the eardrums. Thus, present entertainment systems do not allow users to fully experience the individual vibratory rhythms of audio entertainment.

All present listening devices, including headphones, speakers, subwoofers, tactile transducers, etc., concentrate on the bass frequency being fixed to one central vibratory response. The user is not able to feel the rhythmic, tactile sensation, generated by the other individual parts of a musical arrangement.

Accordingly, it would be beneficial to provide an entertainment system that overcomes these and other obstacles.

SUMMARY

It is an object of the present application to provide an entertainment system including a media player that provides an audio signal and a plurality of vibratory output signals based on individual tracks of a musical piece, and a plurality of actuators that receive respective vibratory output signals and vibrate to stimulate nerve receptors in the user's body to enhance the entertainment experience.

An entertainment system in accordance with an embodiment of the present application includes a portable media device configured and operable to simultaneously produce a audible output signal, and a plurality of individual vibratory output signals based on individual recorded tracks of a musical piece and a plurality of actuators positioned at various locations on a user's body, each actuator configured and operable to receive one of the plurality of individual vibratory signals and to vibrate based on the received vibratory signal.

An entertainment system in accordance with another embodiment of the present application includes a portable media device configured and operable to produce at least an audible output signal of a musical piece, and a plurality of actuator modules positioned at various locations on a user's body, each actuator module configured and operable to vibrate.

A method of mixing a musical piece in accordance with an embodiment of the present application includes utilizing an entertainment system including a plurality of actuators that are configured and operable to vibrate based on vibratory signals derived from individual tracks of the musical piece to feel vibrations on the body of the user of a plurality of tracks in the musical piece and selecting individual tracks of the musical piece to maximize separation of vibration.

Other features and advantages of the present invention will become apparent from the following description of the invention which refers to the accompanying drawings.

DETAILED DESCRIPTION OF THE EMBODIMENTS

Figure 1:
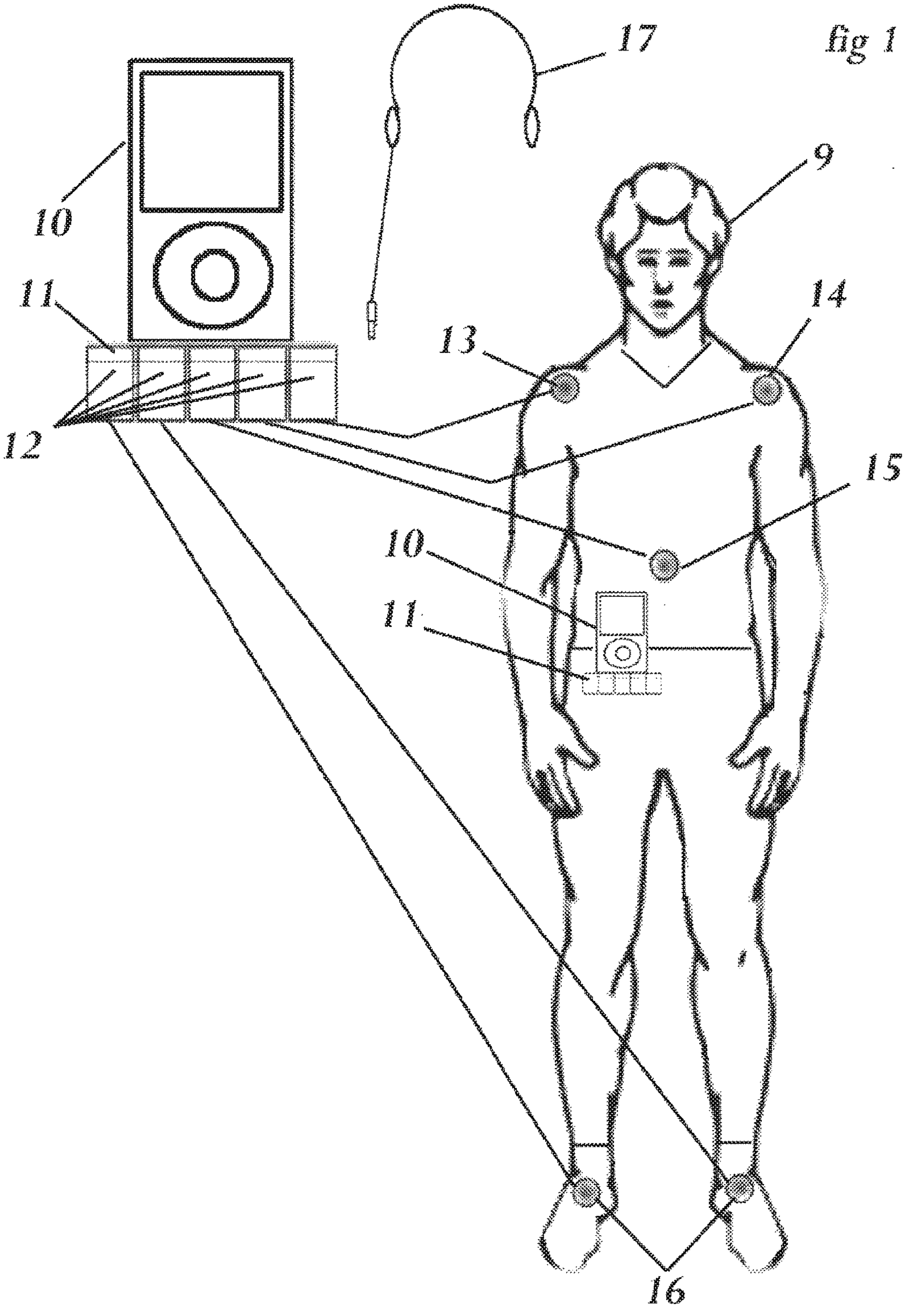
FIG. 1 illustrates an entertainment system III accordance with an embodiment of the present application.

The entertainment system of the present disclosure preferably provides a media player which is capable of providing a stereo output signal for the audio production and multiple, individual outputs for the purpose of generating tactile sensation to a user via tactile transducers, or actuators, affixed on or within worn materials of the user. The tactile sensation produces a much more enjoyable listening experience when compared to an audio signal alone. Using the entertainment system of the present disclosure, the user is able to feel the tactile sensations produced by the actuators, positioned on the user's body. Since each actuator is preferably driven by a vibratory signal related to separate tracks, or instruments, in the music, the user is able to feel the separate instruments, arranged in the music, in separate areas of the body, while listening to the mixed audible signal image of the music through the ears. This creates a true virtual representation of a musical arrangement that can be felt by nerve receptors on different surface areas of the human body. This stimulus based on the separation of musical elements accurately transforms the body's nerve receptors to work in unison with the audible track in the human brain to greatly improve the musical experience, heightening the awareness of the arrangement and rhythmic timing of a musical recording and/or sound effects. The entertainment system of the present disclosure is preferably delivered via a portable media entertainment system.

The entertainment system generates tactile sensation based on sound, such as music, to the whole body. As a result, the user is immersed in tactile sensation based on distinct parts of a musical piece. That is, separate parts of a musical piece are felt in the various areas of the human body, bringing music to life in a way that's never before been done.

Tactile sensation is preferably generated from individual vibratory outputs provided to actuators at various areas of the body. In a preferred embodiment, a portable media device provides multi track playback, and houses a digital to analog circuit capable of providing each of a plurality of separate vibratory output signals, preferably to individual mini amplifiers, housed on the user's belt, or pocket etc. The portable media player also provides a normal audio output mix for conventional headphones or speakers so the user can hear the mixed musical piece.

Tactile transducers create vibration based on a preferably amplified input signal. When normal speakers vibrate, they move a diaphragm, which in turn moves air to send sound toward the listener's ears. When the tactile transducers of the present application vibrate, they do so with less audible sound, passing the vibration energy to whatever they are mounted on. In the entertainment system of the present application, the tactile transducers are affixed on, or within the material that the user is wearing to pass vibrations to the user's nerve receptors throughout the body of the human organism.

The clothing or apparel is preferably integral with the tactile transducers and may be designed to fit any part of the body, such as a shirts, jackets, pants, gloves, footwear, belts, belt buckles, backpacks, hats, suspenders etc, or by creating an ergonomic exoskeleton harness apparatus for the body which positions the actuators and holds them in place. The actuators are preferable light weight, but produce effective vibratory response and are preferably housed in a water proof enclosure with the proper safety compliant design for a wearable experience. This system may be designed for wired or wireless transmission of the vibratory signals to the actuators. Thus, the entertainment system provides the user a more enjoyable, entertaining experience by producing vibrations from the music, and passing the vibrations into the user's body, in a completely new way. Further, when a piece of music is produced on a digital multi track recording system, the engineers would have the ability, in a creative way, to select which tracks will be sent to the individual tactile transducers or actuators, while they are wearing the device in real time. In this case, the engineer feels the separate instruments via tactile sensation. These separate tracks that are chosen, are synchronized with the stereo mix of the content. Thus, engineers and producers would no longer be mixing just for stereo or surround sound, but mixing the music for the purpose of mapping tactile sensation throughout the body of a user which has been synchronized to the normal audible stereo mix. Both the engineer and producer preferably utilize the system, that is, wear the device with the actuators embedded therein while they are producing the musical piece. They may also use audio engineering techniques to enhance the vibration output of the chosen audio tracks used to provide the vibratory force feedback. These techniques get the most out of the flexibility of the digital recording process. One such technique would be to use pitch shifting on the particular tracks chosen. By pitch shifting down the chosen tracks, the engineer and producer will augment the signals to achieve the desired vibratory response keeping the timing synchronized to the audible signal. For instance, to be able to feel sound via the actuators that was originally recorded in higher frequency registers, like a woman's voice or cymbals, these pitches may be shifted down to create more vibratory response at the actuators. The chosen tracks can also be grouped together, or combined in certain situations to provide the engineer and producer the flexibility to achieve an artistically felt production, as well as an audio production that works synergistically in the sensory cortex of the brain to provide a new way for users to enjoy audio entertainment. This individually chosen and modified digital material becomes new media data for the device, not meant for audio to the ears, but for the synchronizing force feedback vibration of individual tracks that were chosen for the experience. This vibratory digital data may be sold, and downloaded to the multi-track media player for operation. Thus, the entertainment system of the present application gives the engineer and producer new possibilities, with a whole new way of producing music to be sold.

In one example, a music connoisseur, wearing a shirt with an actuator mounted to the middle, upper back area would feel the rhythm vibrations generated by the bass guitar track. At the same time, the output vibratory signal for the guitars could be sent to actuators on the front of the shirt, one actuator on each shoulder. The right shoulder would be rhythm guitar and the left shoulder would be lead guitar, for example, thus generating a vibration response based on the guitar tracks. Actuators may be mounted on user's footwear to receive the drum track. The entertainment system of the present application uses the power of touch to communicate the separate tracks of the whole musical piece. While the user is feeling the arrangement of the separate instruments, by the various tactile sensations through his or her body, the user would also be listening to a stereo mix of the musical piece with headphones or speakers.

FIG. 1 illustrates an exemplary embodiment of an entertainment system 1 in accordance with the present disclosure. The system 1 preferably includes a handheld media device, or player 10. The device 10 is provided with and is capable of simultaneously producing an audible stereo signal of a musical piece along with five (or more) individual vibratory output signals based on tracks of that musical piece. These vibratory output signals are related to individual tracks that are typically included in the audible signal and commonly represent separate instruments within the musical piece. While five vibratory signals are discussed herein, additional or fewer individual vibratory signals may be used. The media player 10 may be inserted into a docking station 11 on the user's belt, or elsewhere.

The docking station 11 preferably connects the five individual vibratory output signals from the media player 10 to five mini amplifiers 12 included therein. Additional or fewer mini amplifiers 12 may also be used as desired, however, it is preferable to have at least one mini amplifier for each of the output vibratory signals from the player 10. In a preferred embodiment, a power source 20 (See FIG. 3, for example), such as batteries, for example, powers the mini amplifiers 12 to drive the actuators and are also provided within the docking station 11. The actuators are preferably affixed to apparel and footwear worn by the user 9. For example, the actuators 13, 14, 15 are affixed to the user's shirt. In a preferred embodiment a single amplified, or enhanced, vibratory output signal is provided to each actuator. Thus, a different tactile sensation generated at each actuator based on the separate vibratory output signals of the player 10 felt by the user 9 wearing the apparel in various areas of the body.

Figure 3:
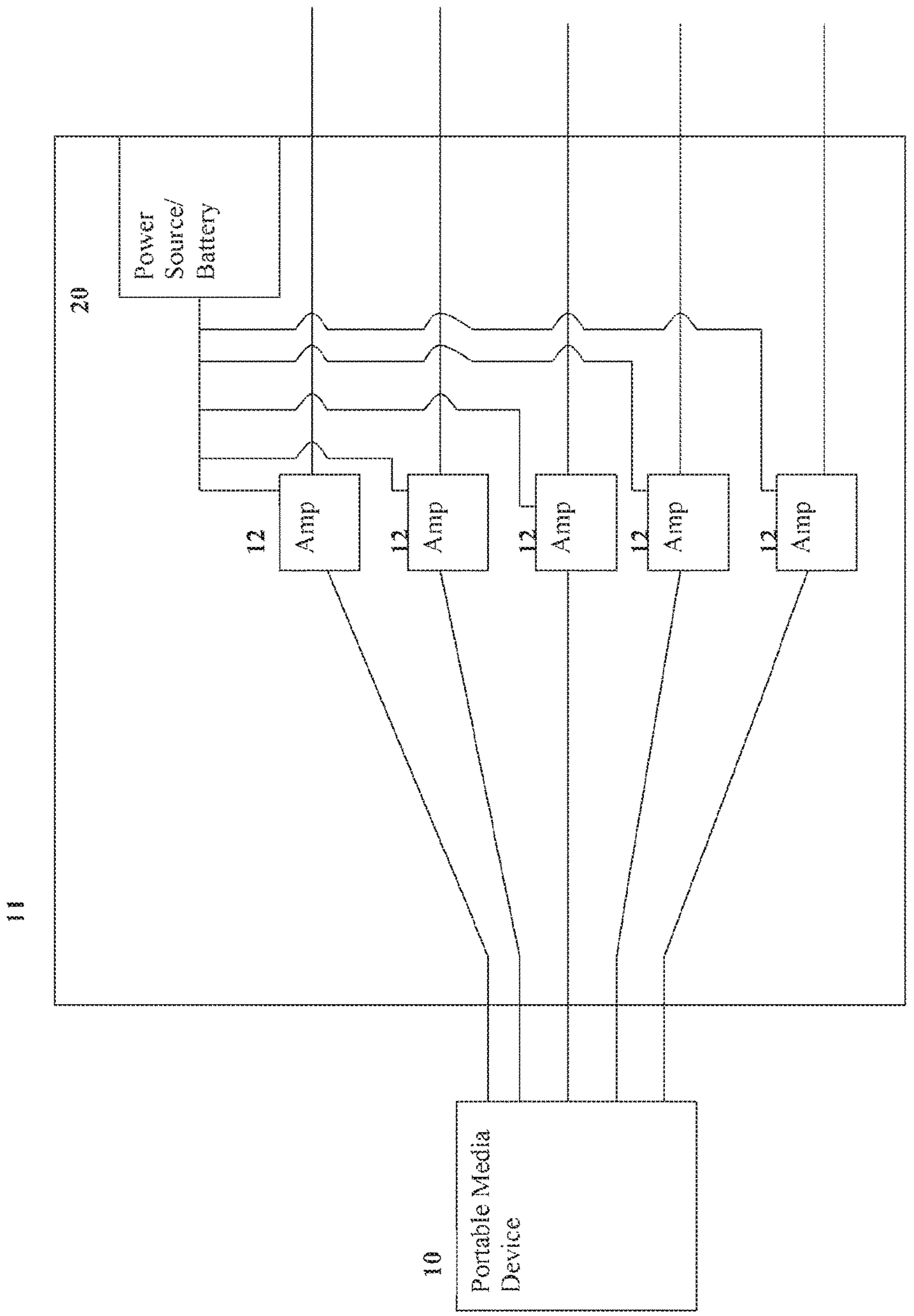
FIG. 3 is an exemplary block diagram of a docking station suitable for use in the entertainment system of FIG. 1.

FIG. 3 is an exemplary block diagram of the docking station 11 of FIG. 1. As noted above, the docking station 11 preferably included several mini amplifiers 12 to which the individual vibratory signals of the player 10 are provided to be amplified. The power source 20 provides power to the amplifiers 12.

The entertainment systems portable media player 10 preferably offers volume controls to adjust the volume level from the audio content for the user's ears and for the vibration intensity of all actuators. This is achieved via the multi track software running on the portable media player. However, a micro headphone volume control potentiometer jack can be implemented to adjust the audio level to the ears. Also, a potentiometer that incorporates an on and off switch can be interfaced to each of the mini amplifiers 12 to control the intensity and on and off controls of each powered actuator. Once all connections to the docking station 11 are made, after confirming connections to all the actuators 13, 14, 15, 16, the user 9 may put on the headphones 17 and turn on the device 10. The user can then adjust the desired level of the audio content via headphones 17, with the force feedback vibratory stimulus produced by the actuators.

In one embodiment, the media device 10 integrates multi track playback software technology with the portable media player's operating software. The device 10 preferably also includes an output circuit for multi track digital to analog conversion based on the device's programming and operating system capabilities. Thus, the amplified vibratory output signals provided to the actuators are preferably analog signals. The method or arrangement of wiring or connecting the above electronic components in the device 10 will be well known to those with good skill in audio electronics. In a preferred embodiment, the actuators 13, 14, 15, 16 are mounted on or within any worn material of clothing, apparel, footwear or wearable accessories by affixing the actuators to the wearable material to hold them in place on the body. The actuators are preferably positioned where the actuator is applying the most vibration to the user's nerve receptors. There are many different ways to affix the actuators 13, 14, 15, 16. For instance, each actuator may be mounted in the material of the apparel. The actuators 13, 14, 15, 16 could be embedded in the material, for example, by slitting the material, creating a pocket and then inserting the actuators into the pocket. Another way to affix the actuators 13, 14, 15, 16 is to simply mount them to the apparel or footwear by means of straps, clips, tie wraps, Velcro. Also, the connections to the actuators 13, 14, 15 and 16 can be affixed or clipped on the worn materials of user from the media players docking station 11. Another way of applying the devise to the body of the user is by creating an ergonomic exoskeleton harness apparatus for the body that mounts the actuators and necessary electronics to complete the experience, or any other mounting method. The most important thing is to mount the actuators 13, 14, 15, 16 in such a way that the vibration penetrates into the user's body.

The vibratory signals from the handheld media device 10 can be sent via a wireless transmitter to a receiver and mini amps, affixed to the apparel, for example, to allow for wire free operation and may be Bluetooth compliant, for example.

Figure 2:
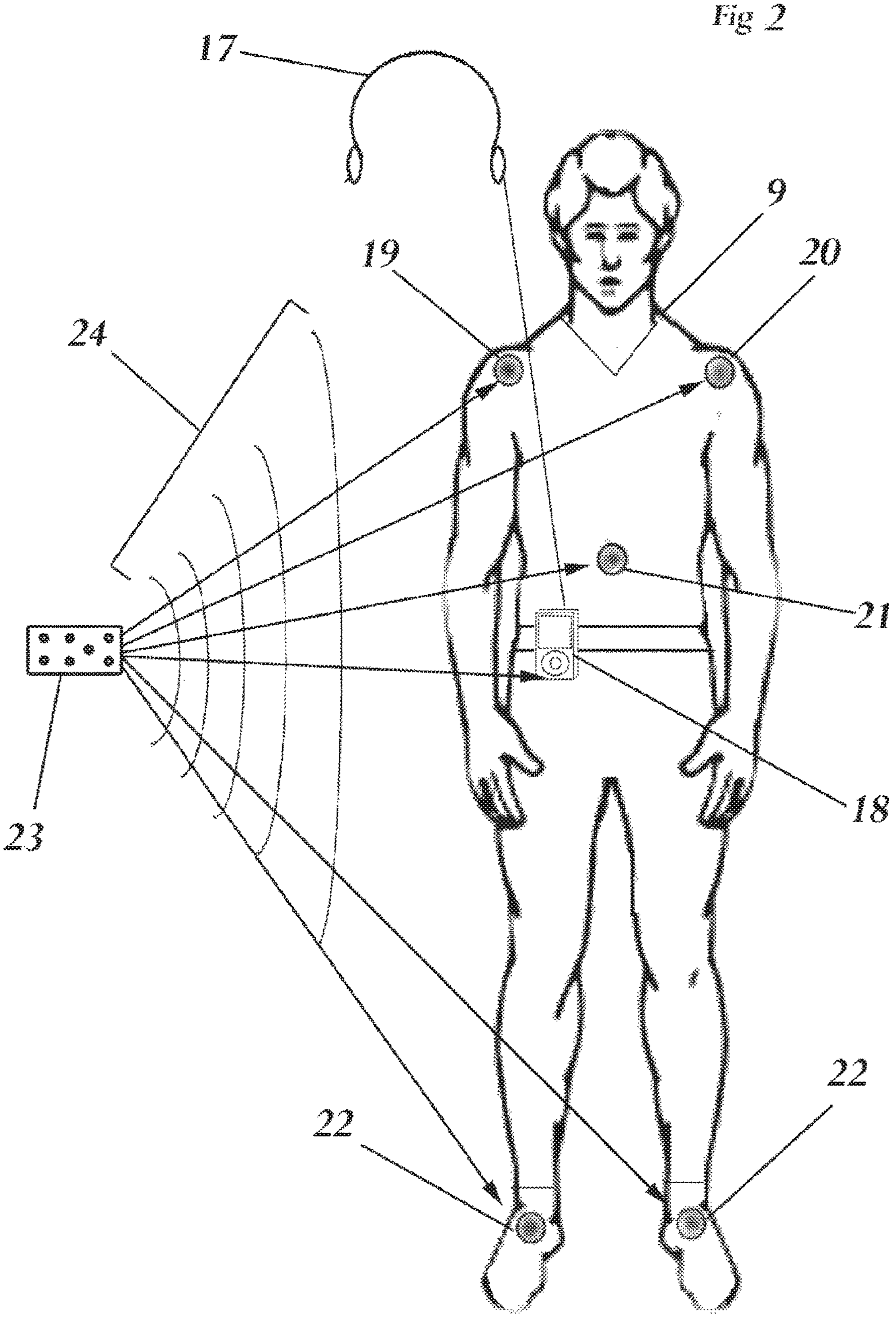
FIG. 2 illustrates an entertainment system in accordance with another embodiment of the present application.
Figure 4:
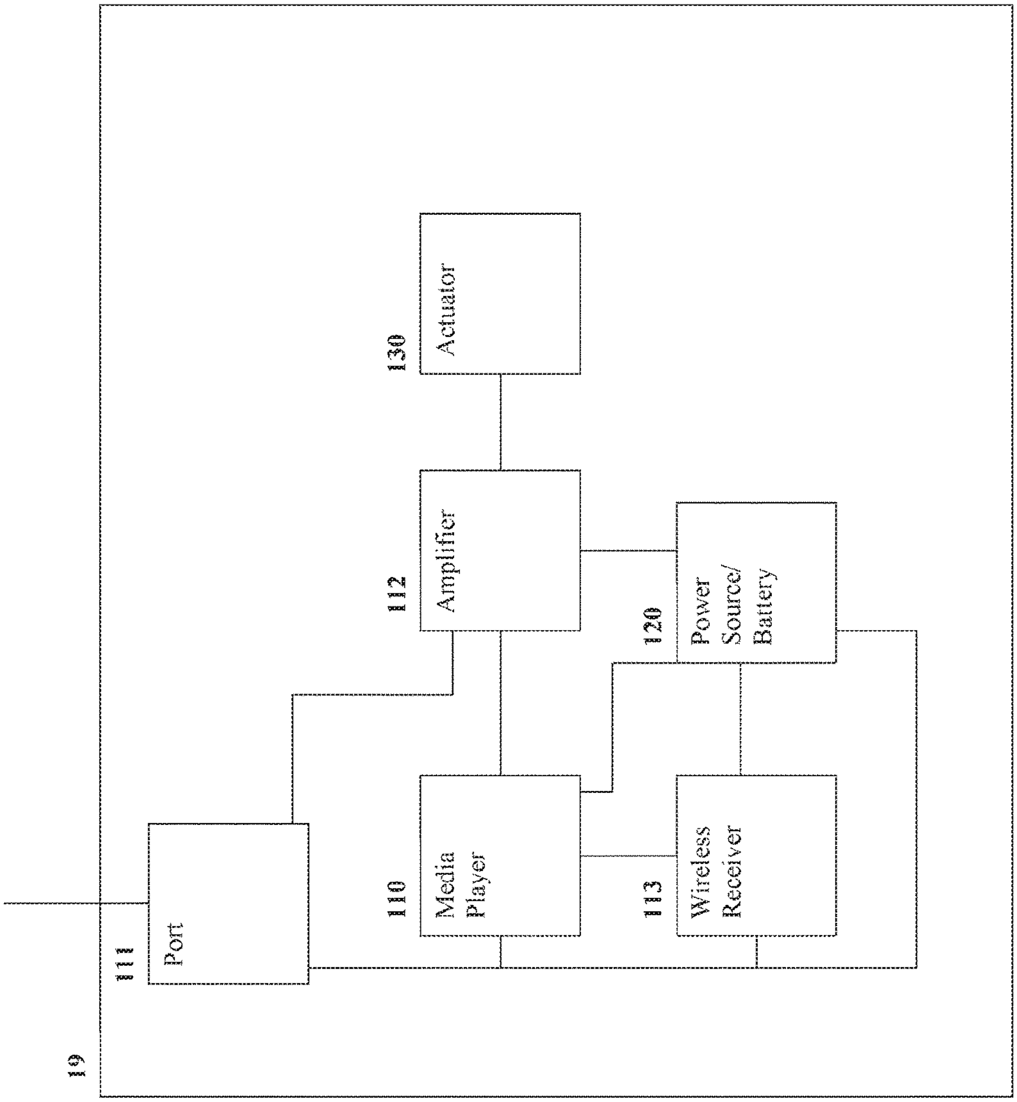
FIG. 4 is an exemplary block diagram of an actuator module suitable for use in the entertainment system of FIG. 2.

In another embodiment, the entertainment system may be streamlined to include multi-channel digital synchronization of separate micro digital media players. FIG. 2 illustrates an exemplary embodiment of an entertainment system 101 utilizing separate micro digital media players 110 (See FIG. 4, for example). Conventional music recording techniques involve multi track recording as noted above. That is, the individual instruments are recorded on different tracks, and then mixed together to produce a musical piece. However, it would be very beneficial to the music enthusiast to experience each of the individual instruments separately while enjoying the audible musical production mix. This variation can be achieved by using multiple, micro portable digital players 110 that interface in individually powered and amplified actuator modules 19, 20, 21, 22. Each separate module 19, 20, 21, 22 houses an actuator 130 (See FIG. 4) and is integrated with a micro digital portable media player 110, power source 120, amplifier 112, and remote control wireless receiver 113. FIG. 4 is an exemplary block diagram of module 19. All receivers 113 are preferably tuned to the same frequency to receive remote control commands 24 from a single remote control 23. The modules 19, 20, 21, 22 may be positioned throughout the body as shown in FIG. 2. Also, all modules may have a retractable clip-on tether, on which the wireless receiver may be mounted such that it can be moved into a better position to receive remote control commands 24. The tether may also support a light emitting diode (LED) to indicate transmission of control commands, if desired. In addition a port III is preferably provided to allow for the interface of accessories and peripherals also for transfer of information. In a preferred embodiment, the port III is a USB port and may be used to receive commands 24, if necessary or information for the player device 110. Also USB port III may interface a small radio tuner for broadcast entertainment to be felt by the user. In addition the port III may be connected to a power supply to recharge the power source 120.

In this embodiment, there are no restrictions on the portable media player 18, other than providing a mini volume potentiometer jack to control the audible signal to the ears via headphones 17 or any other suitable audio speaker. There is no limit to how many actuator modules can be affixed to the body since each individual module has its own output and vibration capabilities. There is also no wireless or hardwired transmission of vibratory signals from one device to the other. If desired, a hardwired connection may be used to synchronize all devices 110 via the USB port Ill.

As mentioned above, the engineer and producer may decide what individual musical tracks are best suited for the overall experience. The musical data of an individual instrument's track may be enhanced or augmented by the musical engineer, to get the desired force of vibration out of the actuators, if need be. In a preferred embodiment the engineer and producer would use the system 1, 2, that is wearing the device while mixing the music while interfaced with their recording equipment's outputs. Once the desired track is chosen, it may be enhanced for maximum vibratory response by the producer or engineer as mentioned above. Further, while the individual vibratory output signals are typically based on an individual track, they may include elements of other tracks, as desired, to enhance the experience. Indeed, the individual vibratory tracks may be a combination of various tracks and may be designed such that a user will experience the vibrations of a single track seemingly moving from one actuator to another, through the body of the user. Thus, to the user, it will feel for example the rhythm guitar and bass guitar have switched places on their body.

This new art form offers limitless ways of mixing audio to produce vibration to the body. As noted above, any audio chosen need not be produced to stay on one module actuator on one area of the body, meaning the audio data can be edited or routed in a way to interchange from module to module in any chosen area of the body to produce the effect of the audio vibration moving through the body of the user. Also each individual actuator module need not only have one instrument applied to its vibratory signal. The producer and engineer might decide at any given time in the produced song to edit in any configuration of any of the digital recorded audio tracks to achieve the desired stimulation effect. The chosen tracks can then be downloaded to individual micro media players 110 of the modules 19, 20, 21, and 22. All modules share the same hardware and operation commands via remote control so that they are synchronized and tuned in to receive remote control commands in unison. The individual musical parts at each module is cued to operate in unison with all others just as if one were controlling one audio playback device with a remote control. The identical control of separate multi track vibratory data signals synchronized to the audible stereo mix produces a more immersive experience. The modules are housed with a micro digital media player 110, power supply 120, micro amplifier 112, actuator 130, and remote control receiver 113, to receive control commands 23 from a remote control transmitter 24, as well as a USB port for downloading content to the devices and for interfacing accessory options.

Also the individual tracks chosen by the producer and engineer can be transferred onto flash memory cards, or any other desired media and sold to be inserted into the media player housed with the actuator module. One may prefer an augmented mix of the complete audio mix to insert into the media player housed with actuator. This unique feature also allows for not only a wire-free operation from device to device, but also avoids the need for wireless transmission of audio signals from one device to another. It's a clean system, in that the synchronization of unified digital entertainment data is controlled by remote control commands, just as you would on a home stereo. This system offers virtually limitless options to cue sound to vibration, for music, video games, movies, and virtual reality. Support could be provided for accessories, for instance, different options could exist, such as wireless communications to the device modules 19, 20, 21, 22 from outside sources, these accessories would include transfer of video game audio and movie audio interface devices.

The exemplary system is shown in FIG. 2. The user 9 is equipped with a portable media player 18 which houses a wireless remote control option receiver. Individual actuator modules 19, 20, 21, 22 house electronics necessary to initiate vibration of the actuator 130 housed within each and are attached to the body of the user. In this example, each actuator module 19, 20, 21, 22 include an individual micro digital media player 110. The actuator modules 19, 20, 21 and 22 are attached to various areas of the body of user 9. Actuator module 21 is attached to the stomach area, module 20 on the left shoulder, module 19 on the right shoulder. Each actuator module in the illustration of FIG. 2 may initiate individual instrument's vibration in unison. For instance, actuator module 21 would be initiating the vibration of the bass guitar line in the stomach area of user 9. Actuator module 20 on the left shoulder of user would be initiating vibration of the lead guitar and module actuator 19 would be initiating vibration of the rhythm guitar on the right shoulder of user. The actuator modules on the feet of the user 22 may initiate stereo vibration of the drums in the right and left foot. The user could then attach headphones 17 to the portable digital media player 18 clipped to the user's belt, which contains the audible stereo production of the music mix.

The user would then be able to aim his remote-control device 23, or his handheld media player with remote control commands interfaced to it, toward his body to transmit control signals 24 to initiate play on all digital media devices 110 and enjoy not only hearing but also feeling the different force vibrations, from the individual vibratory signals, via the individual digital micro media devices housed in the actuator modules that provide the vibratory information, along with the electronics necessary to initiate vibration of the module actuator. This simultaneous effect immerses the user so he or she can hear and feel the separate musical parts chosen by the producer and engineer of a musical embodiment in unison.

The portable media player 18 may include a control surface with a remote control circuit to send remote control commands 24 to all remote control receivers 113 to initiate control commands for all individual housed micro digital players 110 of the modules 19,20,21,22, thus, bypassing the need for an external remote control 23. While the modules 19, 20, 21, 22 are shown in FIG. 2, more or fewer modules may be used and may be positioned wherever desired. The player 18 is illustrated as clipped to a user's belt; however it is not limited to this positioning.

The media players 10 and 18 for sending the stereo audio signal to the ears may also include an actuator and the necessary electronics to initiate vibration of the stereo mix to the body, if desired. A case for protecting the portable media player 10, 18 may include an actuator and the necessary electronics to initiate vibration of the stereo mix to the body, which can be attached to the pocket, belt or any apparel. The actuator modules may include light emitting diodes (LEDs) that mimic the vibratory response of the actuators with light on all variations of actuator designs. Also, the actuator module housed with mini digital player itself can provide the stereo audible signal to the user's ears via headphones, simultaneously producing the force feedback vibration to the user's body of the stereo mix, this feature could house a microprocessor to convert the signal for more vibratory response, if need be.

In a preferred embodiment, the actuators are mounted to already existing apparel with all electronics necessary to initiate vibration of the actuators. Alternatively, actuators may be mounted on an ergonomic exoskeleton harness which positions the actuators and holds them in place applying the vibration to the user's body to produce the desired multi channel experience.

In another embodiment, a standard computer with a digital to analog converter with multiple outputs may be used in place of the players 10, 18. Various music software programs exist for recording and playing back separate audio tracks, which could allow the user to route the outputs of the soundcard to the various micro amps to initiate vibration to actuators. All of the digital processing and hardware needed to achieve this is easily accessible with a large variety of software options.

In another embodiment, the system could interface with an already existing surround sound entertainment system, in the user's home.

Another way the system could be achieved is through a digital sampler with multiple outputs. A musical piece including different tracks could be broken down into separate output signals, and then sent to the tactile transducers allowing the occupant to feel the arrangement via the separate rhythmical vibrations throughout the body.

The device may allow for recharging batteries that serve as the power source 120, for example, to power the wireless receiver 113 and amplifiers 112. In a preferred embodiment, they may be recharged via the USB port Ill, as noted above.

The tactile transducers, or actuators, may be fitted to the user's already existing apparel or any worn material with a strap or fastener, and can be housed as a single mounting device just clip it to the user's apparel, and plug it into one of the media player's outputs. The housing for the tactile transducers clips on facing toward the skin of the user. The outer part of the housing, clipped to the apparel, will preferably store the batteries, amps, and all connections and controls necessary for operation.

A toy version could be designed for a child to enjoy the separate rhythmical vibrations of any given musical production throughout the body.

This technology creates a live experience whether it is from the user's favorite music, video game music and sound effects, or movie soundtracks and sound effects. In a preferred embodiment, the content is produced for use with the entertainment system to create force feedback vibrations queued to various audio signals from the entertainment content throughout the user's body, immersing the entertainment enthusiast to the state of overdriven sensory perception.

Another application for the device would be geared toward entertainers such as musicians and dancers. For instance, an industry exists around in-ear monitors for entertainers. This allows the entertainer to get close and personal with what he or she is hearing while performing, by way of headphones that are usually inserted in the ears. Often times, by using in-ear monitors, the performer feels cut-off from live vibrations and feels isolated from the rest of the band members. U sing in the ear monitors alone limits the hearing only to the stereo image through the headphones blocking out the natural vibrations of live music. The entertainment system greatly improves the way to monitor music for live entertainers. This system for not only hearing but feeling the music would allow the user to customize his or her own vibration mix, tuning into their desired performing partners and increasing the entertainer's ability to connect with the musical material. The device would give the entertainer better timing skills by allowing the user to tune into different force vibrations of rhythm produced by various musical instruments in real time, shifting the sensory channels into overdrive. The dancer would have better ability to connect with the choreography wearing the device also. All sports enthusiasts could use the device to motivate themselves through heightened sensory perception of what he or she is listening to, to reach deeper for his or her goals.

The system will also be used by music engineers and producers wearing the system for production of music as noted above. In doing so, this would heighten the engineering production options to create a new art form for humans to enjoy. Also the engineer, producer, or writer would have limitless possibilities to explore due to the fact that this technology opens up a new dimension of how an engineer, producer or writer constructs a musical embodiment, now that the sound vibration is alive and running through the body of the user.

One of the other ways to use this system n would be to teach students the mechanics and rhythm of a musical embodiment, by allowing a teacher to break down a musical arrangement, so that the student can feel the different force feedback, generated by the individual parts of the musical embodiment. This would be achieved by the students wearing the system 1, 2.

Another great way to use this invention would be for sports, such as use in skiing, snowboarding and skateboarding apparel, including ski and snowboard boots, to give the user a more entertaining experience. The system could also be used to orchestrate football players and other sports team players where rhythm and timing is a key factor in the game, due to the multi-channel aspect of the different rhythmic patterns of audio vibrations. This can act as a tactile sensation training program from sports to video games and virtual reality.

One of the other ways to use this system IS to teach students the mechanics and rhythm of a musical embodiment by allowing a teacher to break down a musical arrangement so that the student can feel the tactile sensation generated by the individual parts of the music.

This system would greatly improve the sale of music from record companies because it would give their audience a new format and technology to enjoy and experience. This innovation would allow the sale of separate tracks outside the stereo mix, drawing more revenue from the art form of recorded audio. This new media designed for vibratory feedback on a portable platform, can be marketed and sold in every facet of audio production, not just for audio alone, but also for visual vibratory feedback from movies and video games. This advisement in multi-channel vibration synchronized to sound effects and sound tracks allows a new market for all the individual tracks that go into any audio production product. This new media format can be sold for downloading and sold as media, such as on flash memory cards. New device formats in movie audio and video gaming audio to synchronize the vibratory information to this new entertainment experience is highly likely. Radio broadcast stations of the future may send a plurality of radio frequencies, one for the stereo audible music and a plurality of individual frequencies for the vibration information to users of the device.

Although the present invention has been described in relation to particular embodiments thereof, many other variations and modifications and other uses will become apparent to those skilled in the art.

The invention claimed is:

1. An entertainment system, comprising:

a portable media device configured to simultaneously produce an audible output signal and a plurality of vibratory output signals, the audible output signal representing a multi-track recording comprising a plurality of individual recorded tracks, each vibratory output signal based on at least one of the individual recorded tracks of the multi-track recording; and a plurality of actuators positioned at various locations on a user's body, each actuator configured to receive a respective one of the plurality of vibratory output signals and to vibrate based on the received vibratory output signal.

2. The entertainment system of claim 1, wherein the multi-track recording comprises musical content and sound effect content.

3. The entertainment system of claim 2, wherein the plurality of individual recorded tracks include a plurality of instrument tracks and a plurality of sound effect tracks, each instrument track representing a different instrument included in the musical content, and each sound effect track representing a different sound effect included in the sound effect content.

4. The entertainment system of claim 1, further comprising a wearable item, wherein the wearable item is configured to receive the plurality of actuators and position the actuators at the various locations on the user's body.

5. The entertainment system of claim 1, further comprising a plurality of amplifiers, each amplifier configured to receive a respective one of the vibratory output signals from the portable media device and to provide an enhanced vibratory output signal based thereon to a respective one of the plurality of actuators positioned on the user's body.

6. The entertainment system of claim 5, further comprising a docking unit configured to receive the portable media device and house the plurality of amplifiers.

7. The entertainment system of claim 6, wherein the docking unit further comprises at least one power source configured to provide power to the plurality of amplifiers.

8. The entertainment system of claim 6, wherein the plurality of actuators are wirelessly connected to the docking unit and wirelessly receive the enhanced vibratory signals from the plurality of amplifiers.

9. The entertainment system of claim 1, further comprising at least one audio speaker connected to the portable media device and configured to audibly reproduce the audible output signal.

10. The entertainment system of claim 1, wherein each of the plurality of individual recorded tracks is selected from the multi-track recording based on suitability for driving the corresponding actuator.

11. An entertainment system, comprising:
- a portable media device configured to produce an audible output signal representing a multi-track recording, the multi-track recording comprising a plurality of individual recorded tracks; and
- a plurality of actuator modules positioned at various locations on a user's body and configured to vibrate in synchrony with playback of the audio output signal by the portable media player, each actuator module configured to vibrate based on a vibratory signal corresponding to at least one of the plurality of individual recorded tracks, the vibratory signal being different from the audible output signal, wherein each actuator module includes:
- a media player configured to provide the vibratory signal;
- an amplifier connected to the media player and configured to amplify the vibratory signal;
- a module wireless receiver connected to the media player and configured to receive control signals and provide the control signals to the media player;
- an actuator connected to the amplifier and configured to vibrate based on the amplified vibratory signal; and
- a power source configured to provide power to the media player, amplifier, and module wireless receiver.

12. The entertainment system of claim 11, wherein the multi-track recording comprises musical content and sound effect content.

13. The entertainment system of claim 12, wherein the plurality of individual recorded tracks include a plurality of instrument tracks and a plurality of sound effect tracks,
- each instrument track representing a different instrument included in the musical content, and
- each sound effect track representing a different sound effect included in the sound effect content.

14. The entertainment system of claim 11, wherein the portable media device further comprises a wireless receiver operable to receive control signals.

15. The entertainment system of claim 14, further comprising at least one wireless transmitter control device operable to provide the control signals to the portable media device and to the actuator modules.

16. The entertainment system of claim 11, wherein the module wireless receiver of each actuator module is further configured to receive the vibratory signal and provide the vibratory signal to the corresponding media player.

17. The entertainment system of claim 11, wherein the media player of each actuator module comprises an input port configured to receive the vibratory signal.

18. The entertainment system of claim 11, further comprising at least one audible speaker connected to the portable media device and configured to audibly reproduce the audible output signal.

19. The entertainment system of claim 11, wherein each of the plurality of individual recorded tracks is selected from the multi-track recording based on suitability for driving the corresponding actuator module.

20. A method of mixing a multi-track vibratory recording, the method comprising:
- utilizing an entertainment system to feel vibrations representing individual recorded tracks of a multi-track recording on different locations of a user's body, the entertainment system including a plurality of actuators respectively positioned at the different locations of the user's body; and
- for each actuator:
  - selecting at least one of the individual recorded tracks based on suitability for driving the actuator, and
  - providing, to the actuator, a vibratory signal derived from the selected at least one track.

21. The method of claim 20, wherein the individual recorded tracks are further selected to maximize separation of the vibrations felt at the different locations of the user's body.

22. The method of claim 20, further comprising, for each actuator, augmenting the selected at least one track to maximize a vibratory response of the actuator.

23. The method of claim 22, further comprising recording the selected, augmented individual vibratory tracks on media for future reproduction.

24. The method of claim 22, further comprising:
- combining the individual recorded tracks of the multi-track recording to provide a mixed audible output signal; and
- recording the selected, augmented individual vibratory tracks in synchrony with the mixed audio output signal for future reproduction.

25. The method of claim 20, wherein the multi-track recording comprises musical content and sound effect content.

26. The method of claim 25, wherein the individual recorded tracks include a plurality of instrument tracks and a plurality of sound effect tracks,
- each instrument track representing a different instrument included in the musical content, and
- each sound effect track representing a different sound effect included in the sound effect content.

* * * * *